United States Patent Office 2,734,611
Patented Feb. 14, 1956

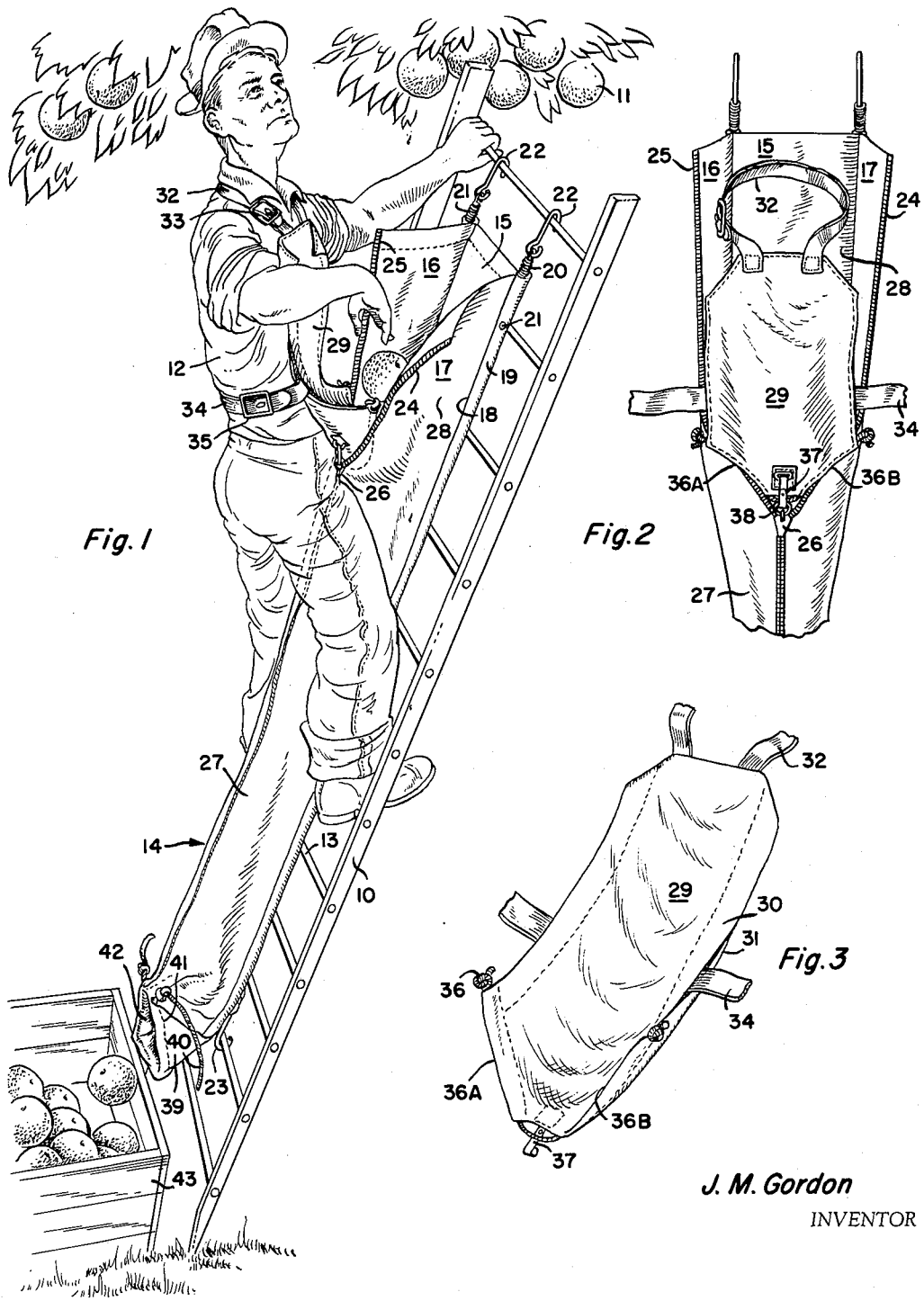

2,734,611

FRUIT RECEIVING CONVEYOR

Jewell Marvin Gordon, Fort Meade, Fla.

Application January 6, 1954, Serial No. 402,501

10 Claims. (Cl. 193—7)

The present invention relates to equipment for use in the harvesting of fruit from trees and, more particularly, to a conveyor structure for carrying the fruit from the point of removal from the tree to a receiving receptacle on the ground.

Heretofore fruit has been harvested from trees by the use of a ladder for supporting each workman and by use of a fruit receiving bag carried by the workman resulting in a heavy load on the workman as well as on the ladder as the bag became filled.

Thus, under prior art practices, the workman had to descend the ladder with the heavy bag containing 75 to 100 pounds of fruit in order to empty the bag into a container. He then had to ascend the ladder again and repeat the operation which resulted in time lost from picking, in addition to the great amount of physical labor required in the climbing. As a result, the efficiency of the workman has not reached its maximum and labor costs have been unnecessarily high because of the energy consumed in the non-productive work of ascending and descending the ladder. The heavy load on the top of the ladder due to the weight of the fruit has increased the danger of the ladder upsetting and the strength and weight of ladders heretofore used have been greater than necessary for merely supporting the workman.

An object of the present invention is to provide equipment which will overcome the difficulties heretofore experienced and result in increased efficiency in harvesting.

Another object of the present invention is to provide equipment which will reduce the labor costs of harvesting fruits particularly from high trees.

A further object of the invention is to provide conveyor equipment for receiving the fruit directly from the picker's hands and depositing the fruit into a receptacle for transfer to the packing plant.

Another object of the invention is to provide equipment for carefully handling fruit to prevent bruising thereof.

A further object is to provide equipment which will reduce the danger of workmen falling.

Briefly stated, the present invention relates to a conveyor for application to a ladder supporting a workman, with the conveyor extending substantially the length of the ladder and being suitable for receiving fruit at any point in its length. The conveyor includes a strip of material having means on the edges of the strap to form a tube from the bottom of the conveyor to the top and such means may consist of a slide fastener which serves to join the free edges of the strip to form a tube of a size to pass between the legs and feet of the workman when his feet are in position on a rung of a ladder during the harvesting operation. A bib type apron is provided for attachment to the workman by suitable means, such as a neck strap and a waist strap, and such apron is attached to the slide of the slide fastener so that the conveyor tube is automatically formed below the workman and a trough is formed above the workman, such apron serving as a funnel for directing the fruit into the conveyor.

Further objects and advantages of the invention will be apparent from the following description taken in conjunction with the drawing wherein:

Fig. 1 is a perspective view of the harvesting equipment applied to a ladder and illustrating a workman wearing the apron while picking fruit;

Fig. 2, a fragmentary front elevation of a portion of the conveyor showing the detachable connection of the apron to the slide fastener; and Fig. 3, a perspective of the apron with portions of the attaching straps broken away.

Referring more particularly to the drawing, a ladder 10 extending upwardly from the ground into a tree having fruit 11 thereon supports a workman 12 on runs 13 thereof. Supported on the ladder is a conveyor 14 constructed from a piece of flexible sheet material such as heavy canvas which includes a rear section 15 and side sections 16 and 17, the rear section 15 resting on the side of the rungs adjacent the workman. The back and side sections 15, 16, and 17 may be made of a single strip of material and suitable seams 18 may provide tubular beads or pipings 19 which may receive springs 20 secured by means of rivets 21 to the conveyor. Suitable hooks 22 extend from the upper ends of the springs over an upper rung of the ladder for suspending the conveyor therefrom. The lower end of the conveyor may be secured to one of the lower rungs by means of one or more hooks 23.

A tubular chute is formed from the rear section 15 and side sections 16 and 17 of the strip material by means of hookless fasteners 24 and 25 on the free edges of the side sections 16 and 17, such hookless fasteners being joined together by means of a conventional slide 26 which progressively forms a tubular portion 27 from the bottom of the conveyor 14, and as the slide 26 is moved upwardly a trough 28 is formed in the portion of conveyor 14 above the slide 26 to the top of the conveyor.

The workman 12 is provided with an apron 29 formed of a single sheet of material folded at the top to provide two plies 30 and 31. A neck strap 32 with a buckle 33 serves as a means for supporting the upper portion of the apron on the workman and a waist encircling strap 34 passes freely between the two plies 30 and 31 to provide for vertical adjustment of the strap 34 for accommodating persons of varying height and sizes and such strap 34 is provided with a releasable buckle 35 or the like for obtaining the desired adjustment. The lower ends of the plies 30 and 31 are folded over and hemmed around a relatively stiff rope 36, which passes loosely through the hemmed over portion and is held therein by knots formed in its ends. The lower portion of the apron has its edges arranged at an angle to converge towards the lower extremity whereby the apron serves as a portion of a funnel for guiding articles into the trough like portion 28 of the conveyor 14, the rope 36 being relatively stiff serving to maintain the converging edges 36A and 36B within the free edges of the side sections 16 and 17 of the trough portion 28. If desired, a relatively stiff member of suitable shape may be substituted for the rope.

A fastener 37 of the snap fastener type releasably secures the usual ring 38 of the slide 26 to the apron 29 so that the slide 26 moves with the apron worn by the workman as he moves up or down the ladder. The converging edges 36A and 36B are maintained within the free edges 24 and 25 of the trough portion 28. The connection between snap fastener 37 and ring 38 may be such that an excessive pull will permit separation of the apron from the slide 26, so that the workman may release himself from the slide fastener by a lateral pull in the event of an emergency.

At the lower end of the conveyor, an elbow structure 39 may be formed from a separate wedge-shaped piece of material secured to the lower ends of the back section 15 and side sections 16 and 17 of the conveyor for directing the fruit laterally outward and away from the ladder and such elbow structure also cushions the dropping of the fruit to prevent bruising of the same. A rope 40 may pass through a hemmed portion 41 of the elbow 39 for adjusting the size of the discharge opening 42. Rope 40 passing through hemmed portion 41 of elbow 39 adjusts the angle and size of the discharge opening 42 and takes into account the angle of the ladder against the fruit tree and the placing and location of containers into which the fruit is sent as it is picked by the workman at the entry portion of the conveyor.

From the above description, the operation of the invention should be apparent. The conveyor 14 is supported on the ladder by means of the hooks 22 and 23 and the workman attaches his apron 29 by means of the snap fastener 37 to the ring 38 of the slide 26 and makes sure that the converging edges 36A and 36B extend within the free edges of the trough portion 28 thereby providing a type of funnel formed by the side sections 16 and 17 and apron 29 so that a workman may use one or both hands to pick fruit and merely drop the fruit onto the apron or into the trough and such fruit will be guided by the tubular portion 27 to the elbow 39 and into a collection receptacle 43 for transfer to the packing or processing plant. The rope 40 may be drawn to reduce the size of the opening 42 and retain the fruit in the conveyor during the removal of the receptacle 43 to prevent the fruit from dropping onto the ground and when another receptacle 43 is placed in position, the rope 40 may be loosened increasing the size of the discharge opening and allowing the fruit retained in the conveyor 14 to drop into the receptacle 43.

It will be apparent that the apron 29 may be secured to the workman by other means such as resilient clips which may partially encircle the body and permit a workman to release himself from the apron in the event of an emergency such as the ladder tipping. Also, the snap fastener connection 37 is preferably of a type to permit disconnection in the event the ladder should tip without requiring the workman to consciously release himself.

The conveyor 14 being made of flexible material remains relatively collapsed throughout a large portion of its length so that the fruit will engage the sides and thereby be retarded in its movement preventing injury to such fruit. Also, the shape of the conveyor permits the conveyor to lie between the legs of the workman without causing any discomfort and, since the workman does not have to support the load of the picked fruit, his efficiency is greatly increased with the use of the present invention.

It will be obvious to those skilled in the art, that various changes may be made in the invention without departing from the spirit and scope thereof, and therefore, the invention is not limited by that which is shown in the drawings and described in the specification, but only as indicated in the appended claims.

What is claimed is:

1. Fruit picking equipment for attachment to a ladder for supporting a workman in elevated position, a tubular chute mounted on one side of the ladder extending substantially to the top of the ladder, hooks on the free ends of the chute for engaging an upper portion of the ladder for suspending the chute on the ladder, means for fastening the lower end of the chute to a lower portion of the ladder, said chute being made of a strip of flexible material having free edges, slide fastener means for connecting the free edges from the bottom to the top progressively whereby the fabric makes a tube for a portion of its length and forms a trough for the remaining portion of its length, the lower end of the chute being formed into an article discharge opening for directing fruit into receptacles located at the base of the ladder, said slide fastener means including hookless fasteners on the free edges of the fabric and a slide mounted on the edges for separating and bringing the edges together, an apron having means for attachment to the body of the workman, means for securing the lower end of the apron to the said slide whereby when the workman climbs up and down the ladder a tubular chute is provided below the slide and a trough is formed above the slide whereby fruit may be placed directly into the trough and dropped into the tube where the apron joins the slide whereby the fruit will be conveyed without damage to the bottom of the chute and discharged into a receptacle.

2. Equipment for picking fruit from trees comprising an elongated strip of material of sufficient length to reach from the workman's position to a position immediately above a fruit receiving receptacle, means for securing an intermediate longitudinal section of the strip in flat relation on one side of a ladder in contact with the rungs thereof, slide fastener means for progressively connecting of the free edges of the strip together from the bottom toward the top to provide a tube portion of varying length from the bottom toward the top and with the edges of the strip free above the so formed tubular portion, the intermediate longitudinal section of the strip being sufficiently narrow to permit the workman to place his feet on a rung of the ladder at opposed edges of such section so that the workman may straddle the tube and deposit fruit therein.

3. The invention, according to claim 2, in which an apron is connected to the slide fastener, readily detachable means on the apron for fastening the same to the body of a wearer whereby the tube is progressively formed as the workman moves up the ladder to provide a closed duct for the fruit.

4. The invention, according to claim 3, in which an elbow is provided at the lower end of the strip for deflecting the fruit away from the ladder and for reducing the impact of the fruit in its descent, and means for varying the angularity of the elbow to accommodate for variations in the inclination of the ladder.

5. For use with a ladder having a pair of rails with a plurality of rungs extending therebetween, of a conveyor chute of a size to be readily received between the legs of a person supported on the ladder, said conveyor including a sheet of flexible material, slide fastener means on the free edges of the material for progressive connection from the lower end thereof to the upper end to progressively form a tube, and means to attach the conveyor to the ladder at the top thereof whereby a workman on the ladder may open the conveyor at a convenient location for receiving articles and means at the bottom of the conveyor for discharging articles.

6. The device as set forth in claim 5, wherein an apron is connected to the slide fastener, and readily detachable means on the apron for fastening the same to the body of the wearer, whereby the tube is progressively formed as the workman moves up the ladder to provide a closed duct for the fruit.

7. A fruit receiving conveyor comprising an elongated strip of flexible sheet material, connecting means for the free longitudinal edge portions of said strip for converting said strip into a chute, said connecting means being separable starting from the upper end of the chute and extending along the length thereof to provide an upper transversely enlarged fruit receiving portion and a lower tube portion, means to support said chute in an upwardly extending position beneath a fruit tree with the edges of the chute separated to locate such enlarged receiving portion at any desired elevation beneath and in proximity to the fruit detached from the tree, whereby such fruit will fall only a relatively short distance into such transversely enlarged receiving portion with proportionate gentle impact and be directed with slight impact against and into the interior portion of the tube and then pass downwardly by gravity and be discharged and collected at the base of the tube.

8. A fruit receiving conveyor as set forth in claim 7, and an apron provided with means to be readily attached to the connecting means whereby the location of the transversely enlarged fruit receiving portion may be varied in accordance with the position of the workman with respect to the chute.

9. A chute device for use in directing fruit detached from a tree and dropping downwardly in a manner both to break its fall and to cause it to reach a localized discharge area uninjured, comprising flexible sheet material providing an upper enlarged receiving portion and a lower reduced conveying portion of a size to permit the fruit to pass freely therethrough but capable of being disposed between the feet of a workman stationed on a supporting ladder, said enlarged receiving portion including a separable segment for attachment at the front of a workman so that during picking of the fruit such separable segment will be disposed in spaced relation and opposite to said enlarged receiving portion.

10. A device for use in connection with a ladder in picking fruit comprising an elongated strip of flexible sheet material, means at the upper edge of said strip for detachable mounting upon a ladder, said means extending downwardly along the sides of the strip, connecting means for the free longitudinal edge portions of said strip for converting said strip into a chute, said connecting means being separable starting from the upper end of the chute and extending along the length thereof to provide an upper transversely enlarged fruit receiving portion and a lower tube portion, so that said chute may be supported in upwardly extending position beneath a fruit tree with the edges of the chute separated to locate such enlarged receiving portion at the appropriate elevation beneath and in proximity to the fruit detached from the tree, whereby such fruit will fall only a relatively short distance into such transversely enlarged receiving portion with proportionate gentle impact and be directed with slight impact against and into the interior portion of the tube and then pass downwardly by gravity and be discharged and collected at the base of the tube.

References Cited in the file of this patent

UNITED STATES PATENTS

| | | |
|---|---|---|
| 1,258,759 | Floehr | Mar. 12, 1918 |
| 1,339,338 | Hickock | May 4, 1920 |